United States Patent
Ishida

Patent Number: 6,122,259
Date of Patent: Sep. 19, 2000

[54] VIDEO CONFERENCE EQUIPMENT AND MULTIPOINT VIDEO CONFERENCE SYSTEM USING THE SAME

[75] Inventor: Kiyoshi Ishida, Yokohama, Japan

[73] Assignee: Hitachi, Ltd., Tokyo, Japan

[21] Appl. No.: 08/807,895

[22] Filed: Feb. 26, 1997

[30] Foreign Application Priority Data

Feb. 27, 1996 [JP] Japan ...................................... 8-039728

[51] Int. Cl.[7] .................................................. H04L 12/18
[52] U.S. Cl. ............................................ 370/260; 370/463
[58] Field of Search ..................................... 370/260, 261, 370/262, 263, 264, 265, 266, 267, 268, 269, 351, 406, 360, 419, 420, 463; 379/202, 203, 204, 205, 206; 348/15

[56] References Cited

U.S. PATENT DOCUMENTS

| | | | |
|---|---|---|---|
| 5,473,363 | 12/1995 | Ng et al. ................................... | 370/260 |
| 5,548,591 | 8/1996 | Horikoshi ................................. | 370/260 |
| 5,680,392 | 10/1997 | Semdan ................................... | 370/261 |

FOREIGN PATENT DOCUMENTS

| | | |
|---|---|---|
| 5-22322 | 1/1993 | Japan . |
| 5-207452 | 8/1993 | Japan . |

Primary Examiner—Huy D. Vu
Attorney, Agent, or Firm—Antonelli, Terry, Stout & Kraus, LLP

[57] ABSTRACT

This is to provided a video conference equipment which can realize a flexible multipoint video conference system unlimited in the number of the terminal attending the conference, by only connecting a plurality of video conference terminals to a network, and a connecting method of the same. A video conference equipment is used in a multipoint video conference system in which at least three video conference equipments are connected with each other via a communication network. The video conference equipment is connected to a communication network via first and second digital lines, each capable of bidirectional communication. External input/output devices, such as a camera for inputting an image, a monitor for displaying a video, a microphone for inputting audios and a loud speaker for outputting audio, are connected to the video conference equipment. The video conference equipment further comprises a data interface unit for controlling input/output of data, a signal processing unit for processing signals inputted from the input devices and signals to be outputted from the output devices, a switching unit for switching over signals to be received and transmitted from the first and second digital lines via the two line control units, signals inputted from the input devices via the signal processing unit, and signals to be outputted to the output devices, and a control unit for controlling each of the elements.

8 Claims, 11 Drawing Sheets

SWITCHING STATE ○: UPPER ON  ● : LOWER ON  "−": OFF

| MODE | SWITCH | | | STATE |
|---|---|---|---|---|
| | A | B | C | |
| SPEAKER 1 | ○ | − | ● | TRANSMIT FROM "a" AND "b" |
| SPEAKER 2 | ○ | ○ | ● | MONITOR "b" INPUT |
| SPEAKER 3 | ○ | ● | ● | MONITOR "a" INPUT |
| THRU-1 | − | ● | ○ | FORWARD FROM "a" TO "b" |
| THRU-2 | ○ | ● | ○ | FORWARD FROM "a" TO "b" <br> TRANSMIT SELF-IMAGE FROM "a" |
| THRU-3 | ● | ● | ○ | FORWARD FROM "a" TO "b" <br> FORWARD FROM "b" TO "a" <br> MONITOR "a" INPUT |
| THRU-4 | ● | ○ | − | FORWARD FROM "b" TO "a" |
| THRU-5 | ● | ○ | ● | FORWARD FROM "b" TO "a" <br> TRANSMIT SELF-IMAGE FROM "b" |
| THRU-6 | ● | ○ | ○ | FORWARD FROM "b" TO "a" <br> FORWARD FROM "a" TO "b" <br> MONITOR "b" INPUT |

VIDEO CONFERENCE EQUIPMENT AND MULTIPOINT VIDEO CONFERENCE SYSTEM USING THE SAME

BACKGROUND OF THE INVENTION

The present invention relates to a multimedia communication system for transmitting and receiving audio, video and data in a real-time manner by using the Integrated Services Digital Network (referred to as "ISDN" hereinafter), and particularly to a multipoint video conference system for performing a multicast to a plurality of multimedia terminals.

A video conference system is one of such multimedia communication systems that communicate audio, video and data by the use of the ISDN. A typical video conference system is configured such that video conference equipments located at two different places are one-to-one connected to hold a conference. Such a video conference equipment is disclosed in Japanese Patent Application laid-open (KOKAI) publication No. 5-207452 (U.S. Pat. No. 5,477,546).

In order to realize conference communication among three or more locations by using such video conference equipments, a multipoint control unit (MCU) is needed which is connected to each of a plurality of video conference equipments which take part in the conference. The MCU has a plurality of connection ports, typically four, eight, twelve, or sixteen, and also includes the same number of line control units, which allows connection to the video conference equipments of the number of the ports as the upper limit. This means that, when a big conference is held among fifty or one hundred locations, the MCU which has fifty or one hundred of the line control units is required.

Another system for a multipoint video conference without using the MCU, which is disclosed in Japanese Patent Application laid-open (KOKAI) publication No. 5-22322 (U.S. Pat. No. 5,402,418), is known in which a video conference terminal is connected via two information channels of the ISDN to separate terminals such that a loop network is formed among the video conference terminals, which take part in a conference, circulating video and audio data on the loop among the terminals. This system is suited to television conferences for four or five terminals, and uses a screen which is divided into four sections each assigned to each terminal for displaying, on the sub-screen thereof, video of each member attending the conference. Transfer of the video is realized such that a data storage area of one video frame, which is circulated on the loop network, is divided into four subareas, each of which is assigned to each terminal for writing its video data into the subarea. Each terminal acts to delete the video stored in its subarea of a received video frame, which was written one round before, and then write a new video, which was taken at the terminal, into the subarea to transmit it onto the loop.

In the multipoint video conference system using the loop network, mentioned above, the terminals share a video frame of one screen and delete/add their videos from and into their own subareas of the divided video frame which is circulated on the loop. This system is suitable for video conferences among four or five terminals, but is not configured to be used for a large-scale conference where there are terminals in excess of that number, such as fifty or one hundred.

SUMMARY OF THE INVENTION

The object of the present invention is to provide a flexible multipoint video conference system unlimited in the number of terminals participating in the conference, without using the MCU, and a video conference equipment to realize the video conference system.

Another object of the present invention is to provide a video conference equipment which is suitable to carry out video conference communication among an arbitrary number of terminals, by only connecting a plurality of video conference equipments to a network, a multipoint video conference system constituted by the video conference equipments and the network, and a connecting method of the video conference equipments.

Another object of the present invention is to provide a video conference equipment which controls, during a conference, display appropriate for conference communication and data transmission/reception among video conference terminals and a connecting method of the video conference equipments and a multipoint video conference system using the same.

Another object of the present invention is to provide a video conference equipment and a video conference system which is suitable to transmit multicast data to a plurality of video conference equipments participating in the conference.

Another object of the present invention is to provide a video conference equipment and a video conference system which multicasts video, audio and data from the speaker terminal to the other terminals participating in the conference, while the speaker terminal can select and output (display), at its terminal, audio, video and data from a desired terminal.

Another object of the present invention is to provide a video conference equipment and a video conference system in which switching transmitting/receiving data is controlled by one terminal acting as a chairman terminal, or by mutual control of terminals participating in the conference.

Another object of the present invention is to provide a linkage equipment for linking a plurality of independent multipoint video conference systems, and a multipoint video conference system which can be expanded by the linkage equipment.

To achieve such objects of the present invention, there is provided a multipoint video conference equipment for a multipoint video conference system in which at least three video conference equipments are connected with each other via a communication network, the multipoint video conference equipment comprising: a data interface unit connected to a communication network via first and second digital lines each permitting bidirectional communication, the data interface unit to be connected, for controlling input/output of data, with an external I/O devices such as a camera for inputting an image, a monitor for displaying a video, a microphone for inputting audio, and a loud speaker for outputting audio; a signal processing unit for processing signals inputted from the input devices and signals to be outputted from the output devices; two line control units for controlling respective communications of the first and second digital lines; a switching unit for switching over signals received from and transmitted to the first and second digital lines via two line control units, signals inputted from the input device via the signal processing unit, and signals to be outputted to the output device; a control unit for controlling the above elements, the switching unit serving to relay the signal received from the first digital line to the second digital line or to transmit the data received from the input device to both the first and second digital lines.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

For video conference communication using video and audio data among three or more locations, the following basic capabilities are to be equipped with the system.

(1) Capability to simultaneously multicast video and audio data to all terminals which participate in a conference.

(2) Capability to contain speaker's data in the multicast data.

(3) Capability to switch the multicast data with change of speakers.

In particular, as the number of terminals taking part in the conference increases, only a few terminals tend to take an active part in the conference and most of the participants mainly watch the video of a speaker. In such a case, the above capabilities (1)–(3) are sufficient to satisfy the need for conference communication. In the following embodiment, an explanation will be given of a multipoint video conference terminal having these capabilities to realize a multipoint video conference system for an arbitrary number of locations at low cost with a compact system configuration, and of a multipoint video conference system using the same.

First, configurations of a multipoint video conference system and a multipoint video conference equipment for use in the system will be explained referring to FIGS. 1 and 2.

Figure 1:
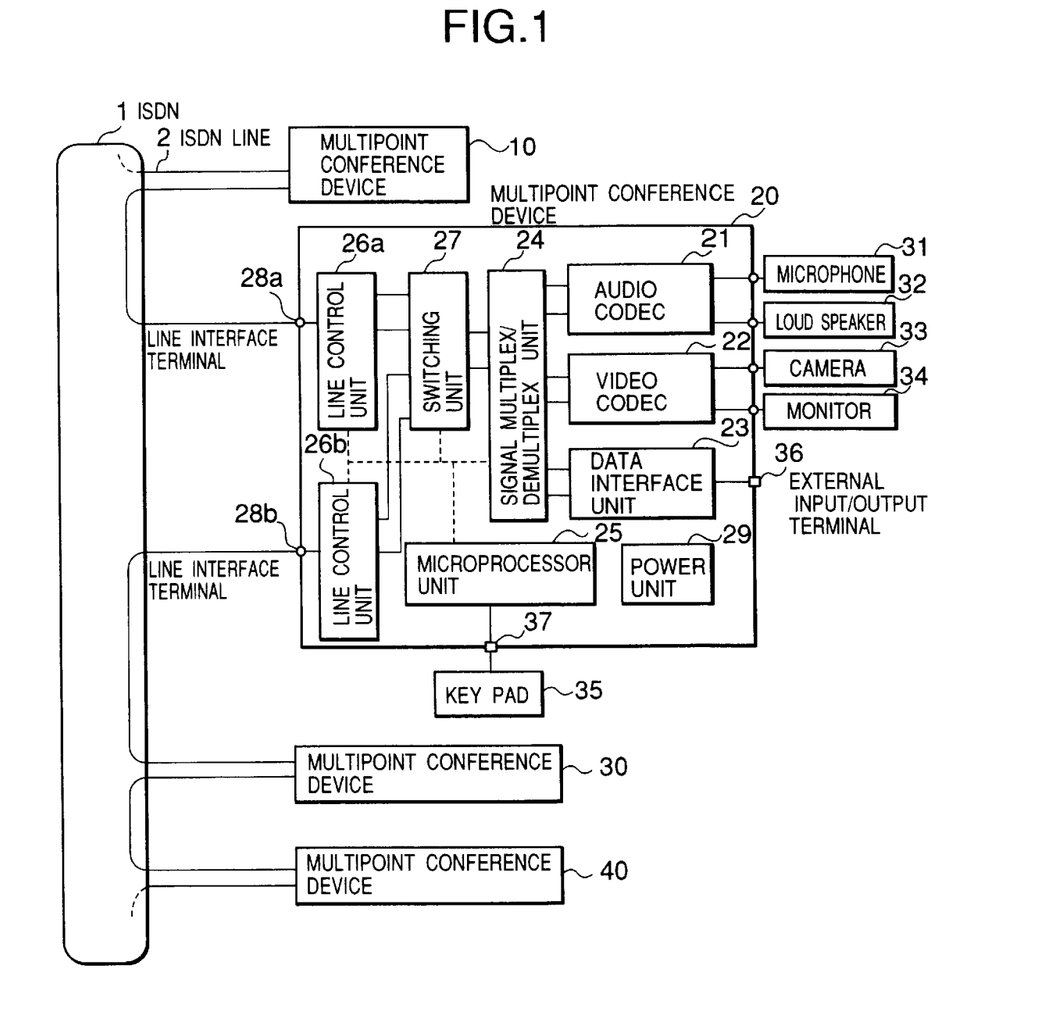
FIG. 1 is a diagram which shows a multipoint video conference system according to the present invention.

FIG. 1 is a diagram which shows a multipoint video conference system according to the present invention. FIG. 2 is a block diagram which shows configuration of a multipoint video conference equipment for the system.

As shown in FIG. 1, the multipoint video conference system according to the present invention is constituted by multipoint conference devices, each of which has two line control units and also acts as a video conference terminal. No MCU is used. The Integrated Services Digital Network (ISDN) of a public network is used as a communication network. Four multipoint conference devices 10, 20, 30 and 40 are used for a conference in FIG. 1. This system is constituted by the four terminals merely to simplify the explanation. However, it is not intended in the invention to limit the maximum number of terminals to be connected, and the following description will apply to the conference of fifty or one hundred terminals.

In FIG. 1, a line control unit 26b of a multipoint conference device 10 is connected via an ISDN line 2 to a line control unit 26a of a multipoint conference device 20, which is in turn connected via an ISDN line 2 at its line control unit 26b to a line control unit 26a of a multipoint conference device 30. Similarly, a line control unit 26b of the multipoint conference device 30 is connected via an ISDN line 2 to a line control unit 26a of a multipoint conference device 40. In this way, all the terminals participating in a conference are connected with each other.

Each of the multipoint conference devices receives multicast data, such as audio or video data of a speaker, incoming via one of the ISDN lines 2, and displays the data on its monitor while sending it to the subsequent terminal under the control of a switch unit 27. By repeating this procedure, the multicast data are transmitted to all of the terminals participating in the conference.

Figure 2:
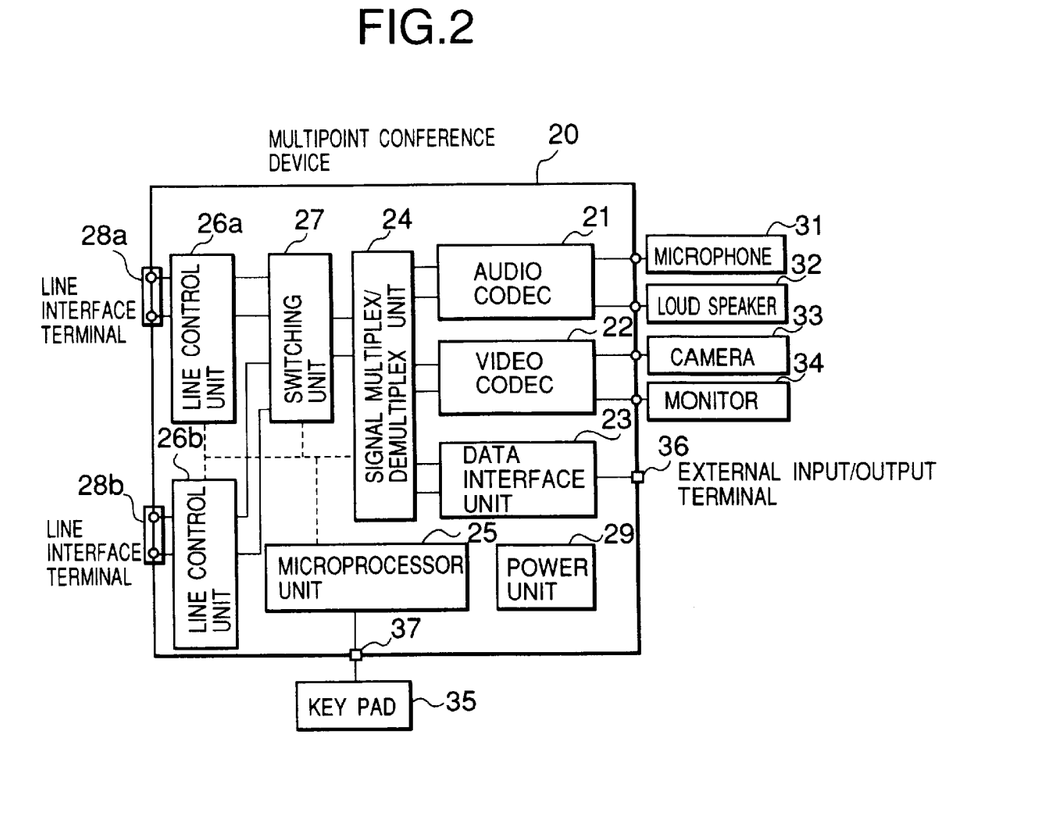
FIG. 2 is a block diagram which shows configuration of a multipoint video conference equipment for the system shown in FIG. 1.

Each of the multipoint conference devices is configured as shown in FIG. 2. Having been illustrated with a single solid line in FIG. 1, one ISDN line is shown in FIG. 2 by two lines, i.e., UP line and DOWN line because the ISDN line has bidirectional channels. The multipoint conference device 20 comprises line interface terminals 28a, 28b for respective ones of the two ISDN lines, line control units 26a, 26b for communication control, the switching unit 27 for controlling switching between the data received from and transmitted to the two ISDN lines and input/output of a signal multiplex/demultiplex unit 24, the signal multiplex/demultiplex unit 24 for multiplexing and demultiplexing signals of audio, video and data, an audio codec unit 21 for encoding and decoding audio signals, a video codec unit 22 for encoding and decoding video signals, a data interface unit 23 for controlling input/output of data signals, an external input/output terminal 36 for the data interface unit 23, a power supply unit 29, a microprocessor unit 25 for controlling the various elements and the device, and a key pad 35 for specifying the control of the microprocessor unit 25 from outside the device. The key pad 35 is connected to the microprocessor via a connecter 37. The multipoint conference device 20 is connected with various peripheral devices including a microphone 31 for inputting audios, a loud speaker 32 for outputting audios, a camera 33 for inputting videos, and a monitor 34 for displaying videos, so as to serve as a video conference terminal.

An operation of the system will now be explained. First, referring to FIGS. 3 and 4, a connection operation of the terminals is explained.

Figure 3:
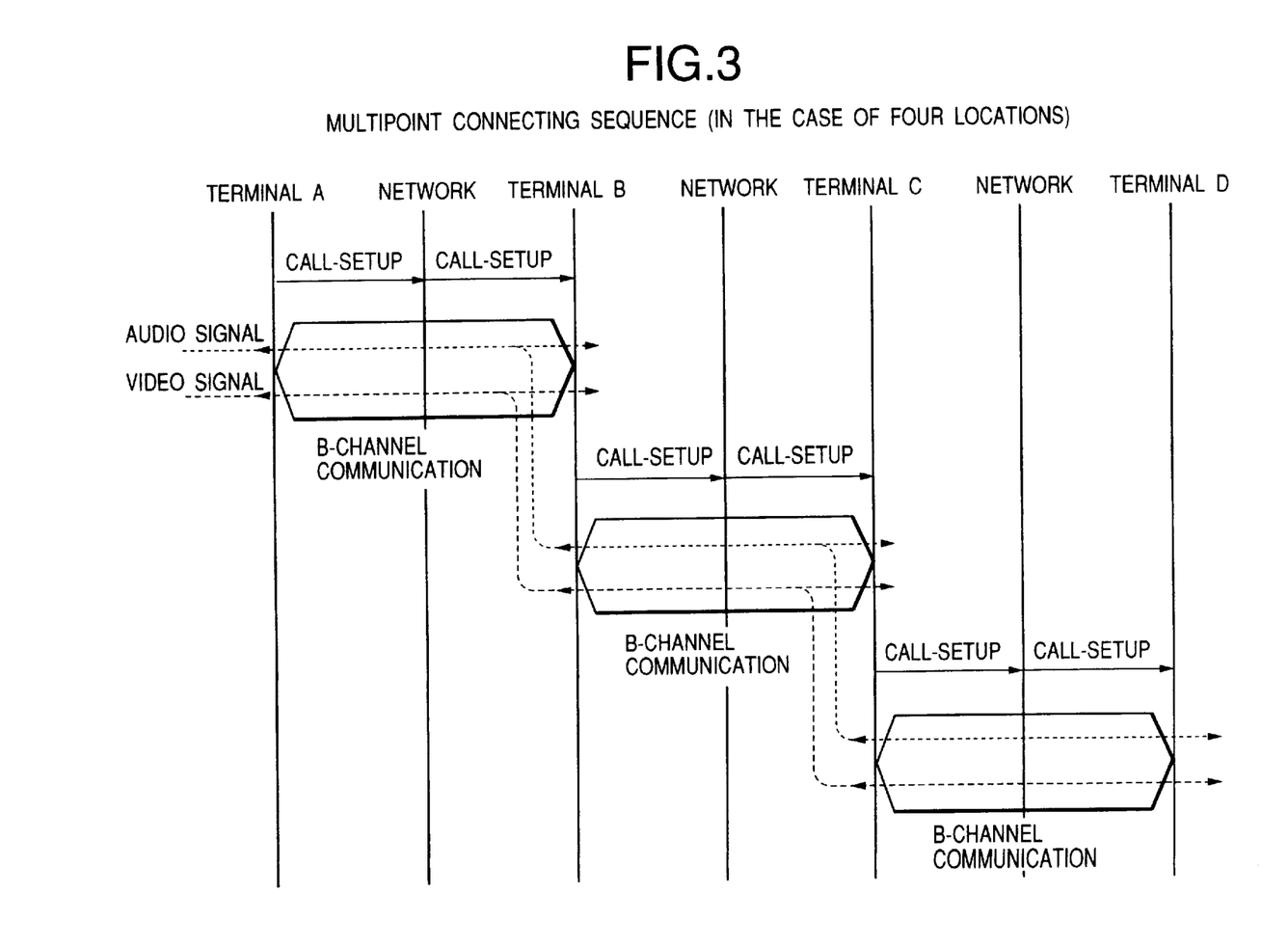
FIG. 3 is a sequence chart for explaining formation of a network of the multipoint video conference system according to the present invention.
Figure 4:
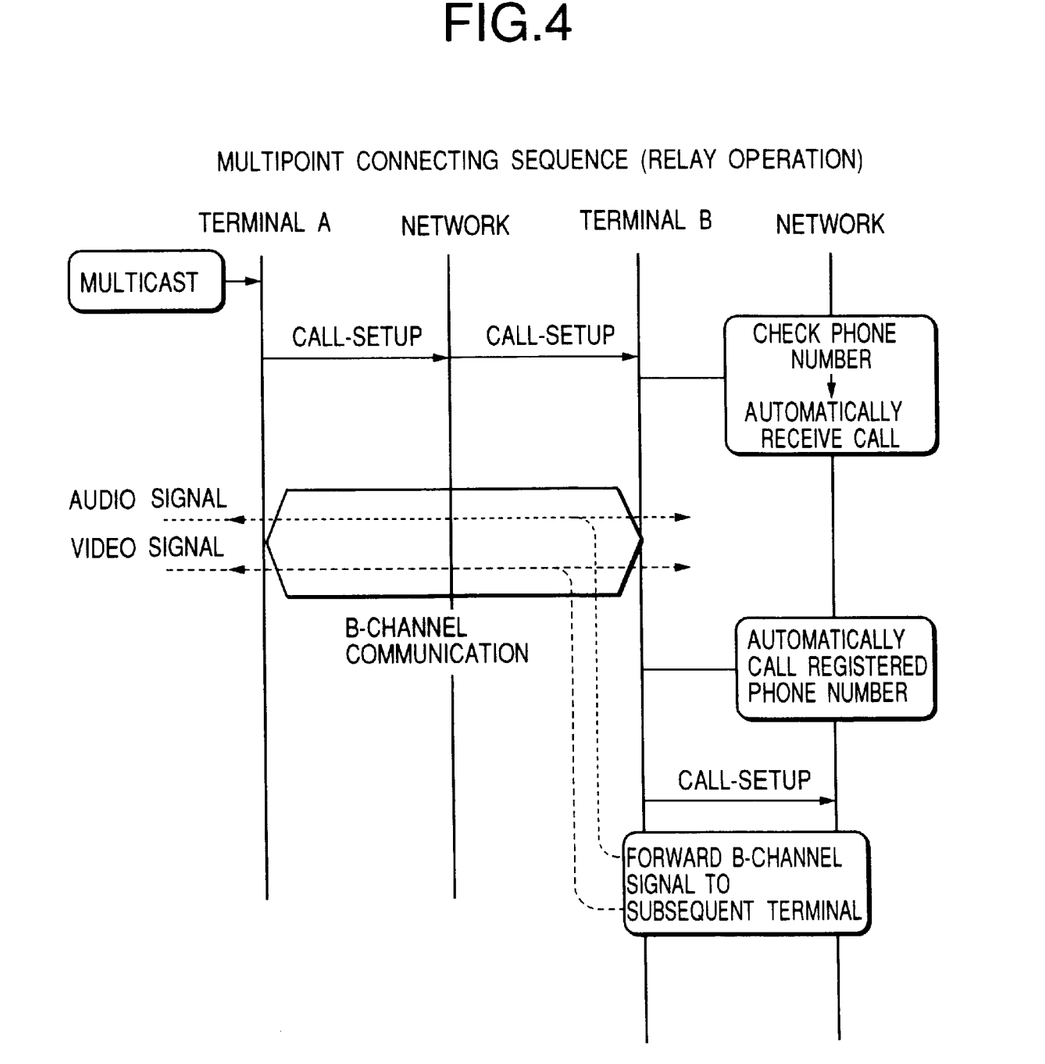
FIG. 4 is a sequence chart for explaining an automatic receiving operation and an automatic transmission operation to the next terminal.

FIG. 3 is a sequence chart for explaining formation of a network of the multipoint video conference system according to the present invention. FIG. 4 is a sequence chart for explaining an automatic receiving operation and an automatic transmission operation to the next terminal.

In FIG. 3, the multipoint conference devices 10, 20, 30 and 40 shown in FIG. 1 are indicated by terminals "A", "B", "C" and "D", respectively. This example shows a case wherein terminal "A" plays a caller. Although a calling operation at terminal "A" may be activated manually, an example will be explained hereinafter in which terminal "A" plays a "chairman" terminal having a list in which telephone numbers of all the terminals participating in a conference are registered, thereby automatically calling them.

First of all, terminal "A" dials the telephone number of the line control unit 26a of terminal "B" based of the list, and starts to communicate with the terminal. The communication is controlled by using the D-channel of the ISDN standard interface. After setting up a call, the B-channel is connected or established. Terminal "B" automatically receives the call. That is, terminal "B" checks, using the microprocessor 25, to see whether the call-setup signal received via the D-channel meets one of the numbers which are registered in a memory thereof in advance, and if the received number matches one of the registered numbers then the call is received. The purpose of this checking of the telephone number is to reject the receiving of calls from irrelevant terminals, to enhance the integrity of the system.

Upon connection via the B-channel with terminal "A", terminal "B" automatically calls terminal "C" via the other line control unit 26b to connect with terminal "C". In this case, the telephone number of terminal "C" is registered beforehand in terminal "B". Alternatively, terminal "A" sends a list of telephone numbers of the terminals participating in the conference via the D-channel, based on which terminal "B" recognizes that the subsequent terminal, terminal "C", need to be called. As in the case of terminal "B", terminal "C" also automatically receives the call by confirming that the call is from terminal "B", to connect the B-channel with terminal "B". Further, terminal "C" automatically calls terminal "D" via the other line control unit side, and terminal "D" automatically receives the call, similarly.

In this way, via the B-channel established among the terminals, multicast data of audio and video are transmitted and received between the terminals.

Referring now to FIG. 4, a connection sequence between the terminals "A" and "B" is illustrated in more detail. First, terminal "A" transmits a call-setup signal via the D-channel to terminal "B" to start multicast. Terminal "B" receives a destination number contained in the D-channel signal and checks to see whether the destination number matches the number information registered in the memory of terminal "B". If the destination number is the same as the registered one, terminal "B" operates to connect the B-channel to communicate audio and video data. There are two B-channels, for both of which the call connection is established. In a case where the destination number matches no registered number, the B-channel will not be connected, releasing the call so as not to perform communication therebetween.

Upon connection of one of the lines with another terminal, terminal "B", under the control of the microprocessor unit, automatically calls another terminal to connect via the other line based on the list which is registered beforehand or received via the D-channel, and thus, connecting the other line to terminal "C". Upon establishing the B-channel connection with terminal "C", terminal "B" forwards the data received from terminal "A" intact to terminal "C". That is, the switching unit 27 operates to branch the received data at the line control unit 26a to the line control unit 26b so as to forward the data to terminal "C".

This system uses the general ISDN lines as a communication network and, hence, communication points can be set at any locations in the area that the ISDN covers. Also, it is preferable to determine the order of calling the terminals, which take part in the conference, based on the list of registered telephone numbers, so as to directly connect two adjacent terminals located at a closer distance, thereby reducing the running cost for the system.

Referring next to FIGS. 5–11, an explanation will be given of an operation of the thus-connected system during a conference. In the following explanation, an example of video data transfer is given, but audio or data can be transferred in the same manner.

First, an explanation will be given of the change of displays at the respective terminals.

Figure 5:
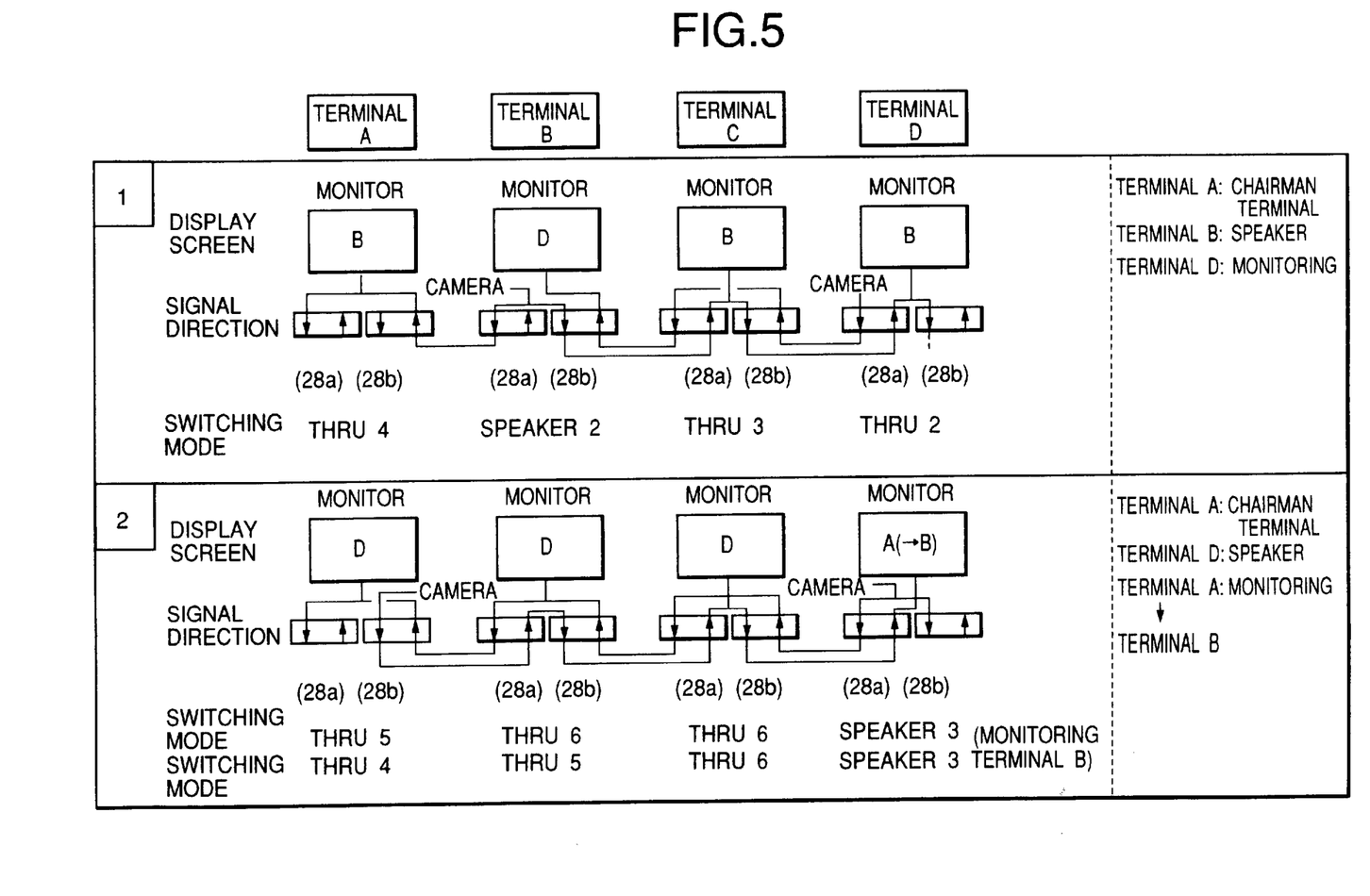
FIG. 5 is a diagram for explaining displays on monitors which are switched with the change of speakers during a conference.

FIG. 5 is a diagram for explaining displays on the monitors which are switched with the change of speakers during a conference.

In the first state shown in the upper part of FIG. 5, terminal "B" is a "speaker" terminal. The terminals other than the speaker terminal display the video from the speaker on their own monitors. The speaker terminal displays a video of an arbitrary terminal on his own monitor. The directions of transmitting and receiving video data in this case are as follows:

The speaker terminal "B" transmits a video, taken by a camera, through both UP-channels of the two line interface terminals 28a, 28b. This is multicast data to be sent to the terminals attending the conference. The video outputted from the line interface terminal 28a of terminal "B" is sent to terminal "A", which is the destination of the line. Terminal "A" displays on its own monitor the video from the speaker terminal "B". On the other hand, the video outputted from the line interface terminal 28b of terminal "B" is sent to terminal "C" which in turn displays the video on its own monitor while relaying the video via line interface terminal 28b of terminal "C" to terminal "D". Terminal "D" displays on its own monitor the video sent from the speaker "B" by way of terminal "C". In this way, the speaker's video is transferred to all of the terminals participating in the conference.

While multicasting the self-image to all of the other terminals, in this system, the speaker can monitor a video taken by any one of the terminals attending the conference. In the first state "1" shown in FIG. 5, the speaker "B" is monitoring the video taken by the camera of terminal "D". Terminal "D" transmits the video, taken by its own camera, via the line interface terminal 28a to terminal "C", which is the destination of the terminal 28a, during time intervals which are not used for the transmitting/receiving of the speaker's video. Terminal "C" forwards the video sent from terminal "D" intact via its line interface terminal 28a to terminal "B". Thus, the speaker terminal "B" monitors the video of terminal "D".

In FIG. 5, the mode indicated in the row of "SWITCHING MODE", such as "THRU 3", "SPEAKER 2", corresponds to a switching mode which will be explained below in the description as to the configuration of the switching unit and its operation.

The second state "2" shown in FIG. 5 is a state in which terminal "D" issues a request-to-speak to the chairman terminal "A", and then terminal "A" permits the speaking of terminal "D", for the purpose of which input/output of each terminal has been switched over.

Flows of videos in this second state will now be explained. The new speaker terminal "D" sends a video taken from its own camera from both UP-channels of the two line interface terminals 28a, 28b. The video outputted from the line interface terminal 28a of terminal "D" is sent to terminal "C", which is the destination of the line. Terminal "C" displays on its own monitor the video from the speaker terminal "D", while transferring it from its line interface terminal 28a to terminal "B". Likewise, terminal "B" displays the video from the speaker terminal "D" while transferring the video to terminal "A". In this way, the video of the speaker terminal "D" is multicast to all the other terminals attending the conference.

On the other hand, terminal "A", which is a terminal monitored by the speaker terminal "D", sends a video taken by its own camera via its line interface terminal 28b to terminal "B", which is the destination of the line 28b. Terminal "B" branches the video, sent from terminal "A", intact to its line interface terminal 28b to forward the video to terminal "C". Similarly, terminal "C" relays the video from terminal "A" to terminal "D". Thus, terminal "D", which is a speaker, receives and displays the video from terminal "A".

If the speaker terminal "D" wants to switch the video to be displayed from, for example, the video from terminal "A" to one from terminal "B", the speaker terminal "D" notifies the chairman terminal "A" of what he wants. In response to the notification, the chairman terminal "A" instructs each of the terminals to switch mode so as to display the video of terminal "B" on the monitor of terminal "D". At this time, the switch mode of terminal "A" is THRU 4, that of terminal "B" is THRU 5, that of terminal "C" is THRU 6" and that of terminal D is SPEAKER 3.

The switching of the transmitting/receiving of videos, responsive to the request-to-speak or a designation of a terminal to be monitored, is performed by each terminal which controls its own switching unit 27 according to control signals sent from the chairman terminal. The switching unit 27 can be operated by transmitting/receiving the D-channel signal among terminals, without specifying the chairman terminal.

Figure 6:
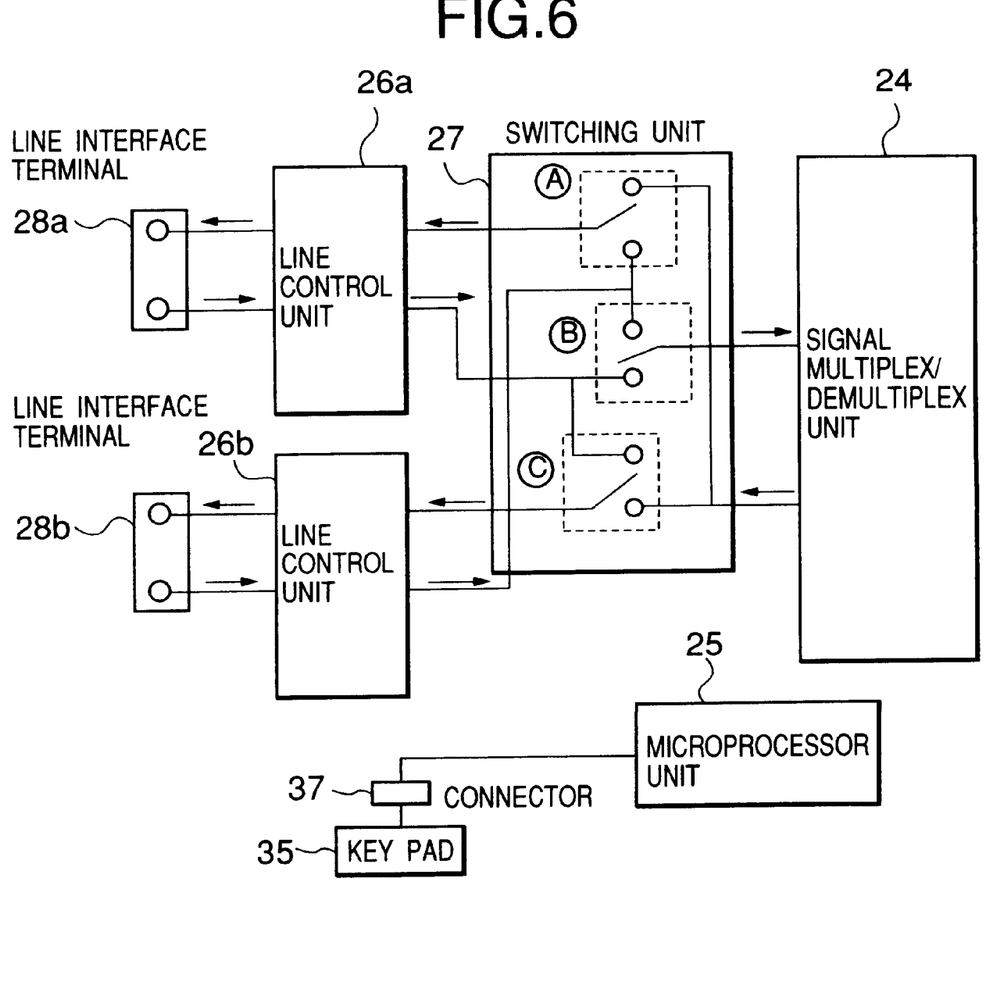
FIG. 6 is a diagram which shows a switching unit.
Figure 7:
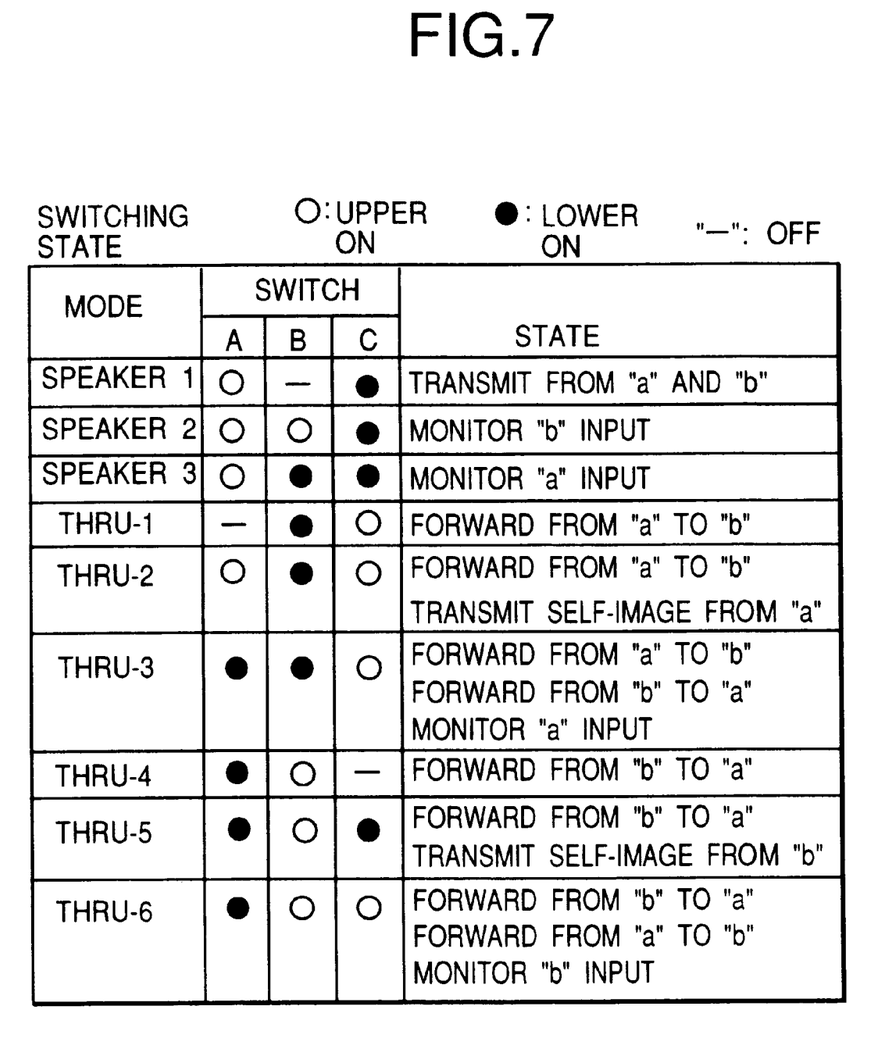
FIG. 7 illustrates an operation table of the switching unit.

Referring now to FIGS. 6 and 7, configuration and operation of the switching unit 27 will be explained.

FIG. 6 is a diagram which shows the switching unit 27, and FIG. 7 shows an operation table of the switching unit 27.

The switching unit 27 of the multipoint conference device is realized by three switches (A), (B) and (C), as shown in FIG. 6. By controlling these switches, either of the videos received from the line interface terminals 28a, 28b is selected, or a video received from one line is outputted from the other line interface terminal. Also, a video taken by the own camera is transmitted from both or one of the line interface terminals 28a, 28b.

FIG. 7 summarizes states of the switches in each mode of a terminal as well as states of the terminal. In FIG. 7, the state of each switch shown in FIG. 6 is expressed such that the white circle indicates that the switch is set ON to the upper fixed contact (upper ON), the black circle indicates that the switch is set ON to the lower fixed contact (lower ON), and a mark "-" indicates that the switch is set OFF.

Firstly, the switch operation for a speaker terminal will be explained.

Upon receipt of a notice of permission-to-speak sent from the chairman terminal, the speaker terminal sets the switching unit to one of the modes "SPEAKER 1", "SPEAKER 2" or "SPEAKER 3" shown in FIG. 7. The difference between these speaker modes 1, 2, 3 is as to which side of the lines is connected to a terminal to be monitored. When the terminal to be monitored is located at the side of the line interface terminal 28a, the "SPEAKER 3" mode is selected. When the terminal to be monitored is located at the side of the line interface terminal 28b, the "SPEAKER 2" mode is selected. When no other terminal is to be monitored, for example, when the self video is to be monitored, the "SPEAKER 1" mode is selected. In the "SPEAKER 1" mode, switch (A) is set ON to the upper contact, switch (B) is set OFF, and switch (C) is set ON to the lower contact, so that a video is outputted from both the line interface terminals 28a, 28b. If switch (B) is changed to the lower ON state with switching states of switches (A) and (C) unchanged, then this is the "SPEAKER 2" mode, in which a video of a terminal incoming from the line interface terminal 28b is sent through the signal multiplex/demultiplex unit, etc. to be displayed on the monitor. When switch (B) is set ON to the lower constant, the mode becomes "SPEAKER 3", in which a video of a terminal incoming from the line interface terminal 28a is displayed on the terminal.

Next, operations of the terminals other than the speaker terminal will be explained.

One of six modes "THRU 1"–"THRU 6" is set for the terminals other than the speaker terminal, as shown in the table of FIG. 7. Each of the "THRU 1", "THRU 2" and "THRU 3" modes is to display the video of the speaker, received from the line interface terminal 28a, while relaying it to the subsequent terminal. Among the three modes, the "THRU 1" mode is simply to relay the speaker's video and display it on the monitor, with switch (A) set OFF, switch (B) set lower ON, and switch (C) set upper ON. The "THRU 2" mode is a mode for a terminal to be monitored, in which the self-image is transmitted from the line interface terminal 28a, with a change of switch (A) to upper ON. The "THRU 3" mode is a mode to relay both the speaker's video and the monitoring video, with a change of switch (A) to lower ON, so that the speaker's video is relayed from the line interface terminal 28a to 28b, while the monitoring video is relayed intact from the line interface terminal 28b to 28a. The speaker's video is sent through the signal multiplex/demultiplex unit, etc. to the monitor to be displayed thereon.

The "THRU 4" to "THRU 6" modes are the same as the "THRU 1" to "THRU 3" modes, respectively, except that the relationship between the line interface terminals 28a and 28b is reversed.

The foregoing switch operation is performed according to the instructions from the chairman terminal or the instructions issued by transmitting/receiving the D-channel signals among terminals.

Figure 8:
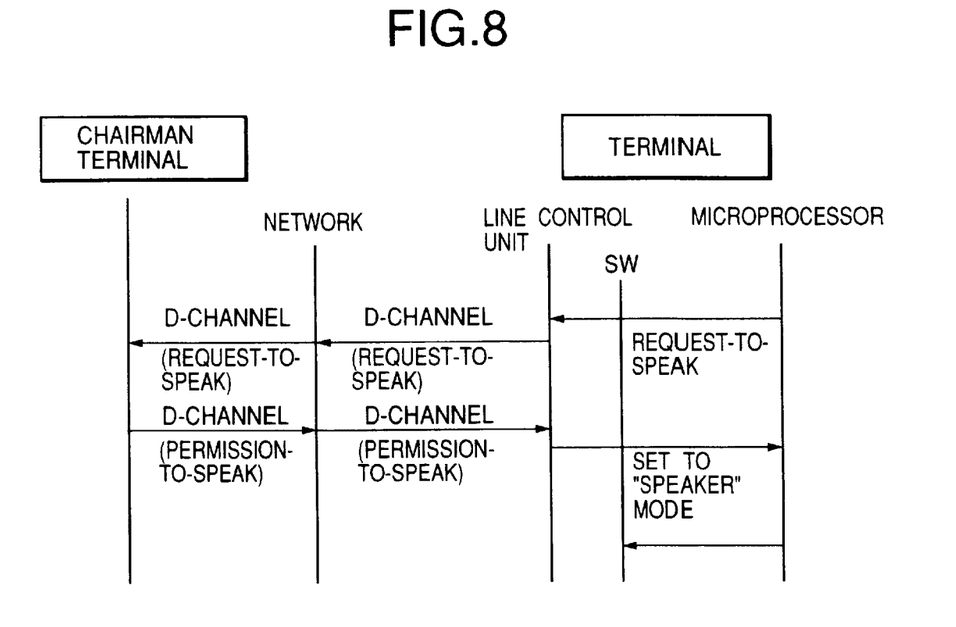
FIG. 8 is a control sequence chart of an operation for setting up a speaker terminal.
Figure 9:
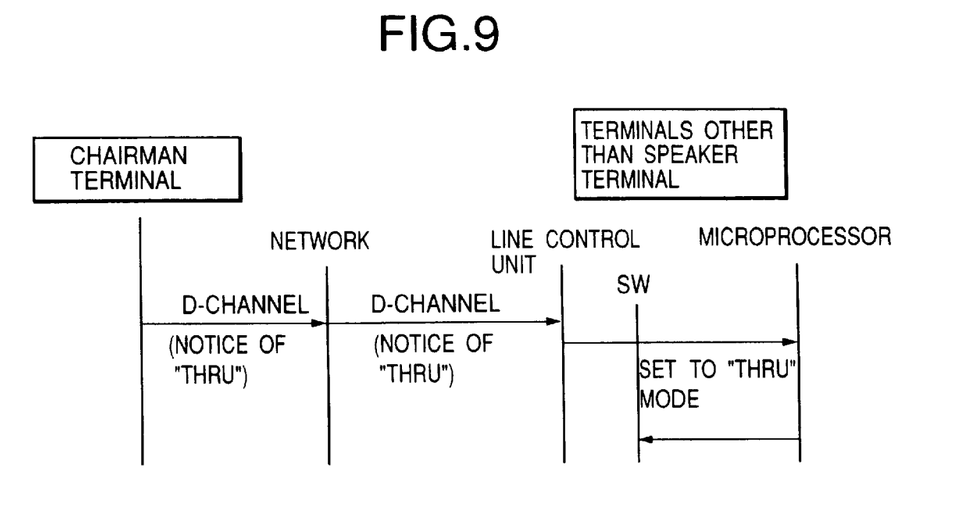
FIG. 9 is a control sequence chart of an operation for setting up terminals other than the speaker terminal.

Referring now to FIGS. 8 and 9, such controlling of the switches will be described.

FIG. 8 is a control sequence chart of an operation for setting up a speaker terminal, and FIG. 9 is a control sequence chart of an operation for setting up terminals other than the speaker terminal.

Firstly, an explanation will be given of the setting of the speaker terminal.

When an attendant of the conference depresses a button for request-to-speak at a terminal, the microprocessor analyzes this and instructs the line control unit to send a request-to-speak via the D-channel to the chairman terminal.

Upon receipt of the request-to-speak, the chairman terminal decides whether the request-to-speak is permitted or not based on presence/absence of the current speaker terminal and other terminals having requested to speak. To the terminal to be permitted to speak, the chairman terminal sends a notice of permission-to-speak, via the D-channel. The permitted terminal analyzes the notice of permission-to-speak using its microprocessor, and sets switches of its switching unit to one of the SPEAKER modes.

Referring next to FIG. 9, an explanation will be given of the setting of the terminals other than the speaker terminal.

After deciding on a speaker and sending the notice of permission-to-speak to the speaker terminal, the chairman terminal sends a notice to specify a THRU mode via the D-channel to the other terminals. Each of the terminals analyzes the notice using its microprocessor, which in turn sets the switching unit of the terminal to the specified THRU mode. The switching unit is set so as to multicast the speaker's video sent from the speaker terminal and also to relay the video, requested to be monitored by the speaker terminal, up to the speaker terminal.

Figure 10:
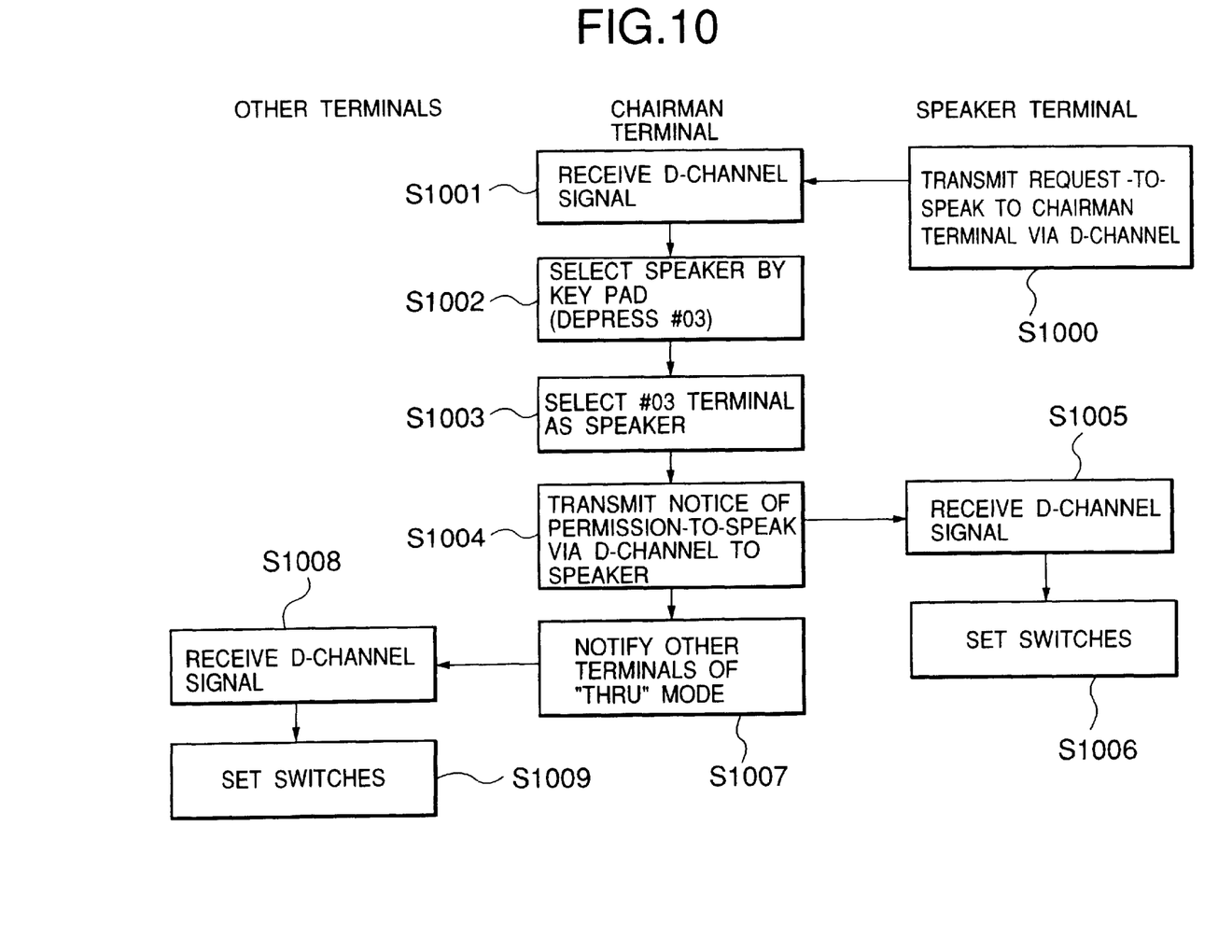
FIG. 10 is a flowchart of control performed during a conference.

The above-explained control is shown in a flowchart. FIG. 10 is a flowchart of control performed during a conference.

In FIG. 10, from the right side, respective flows of the speaker terminal, chairman terminal, and other terminals are shown with the interactions between them.

When a terminal requesting to speak issues a request-to-speak via the D-channel to the chairman terminal (S1000), the chairman terminal receives the D-channel signal (S1001) and determines who becomes a speaker according to an operation of the key pad, taking into consideration the presence of other requesters to speak (S1002). The new speaker is determined by depressing a key "#" followed by a number key, for example, "3" corresponding to one terminal. Thus, the chairman terminal selects one terminal corresponding to the number #3 as a new speaker (S1003), and sends a notice of permission-to-speak via the D-channel to that terminal (S1004). The speaker receives this D-channel signal (S1005), and sets up its switching unit according to the notice given by the chairman terminal (S1006). The chairman terminal also sends via the D-channel a notice which specifies a THRU mode to the terminals other than the speaker terminal (S1007). The other terminals receive the signal from the chairman terminal (S1008), and set up their switching units according to the notice (S1009).

With respect to the capability of monitoring a video of an arbitrary terminal by the speaker terminal, in the case where a terminal to be monitored is specified in the request-to-speak, the chairman terminal sends a switch specification at the notifying steps 1004 and 1007, taking the monitoring into consideration, to the other terminals, which in turn set their switching unit to relay the monitoring video.

In the case where only the transfer route of the video of the speaker terminal is set when issuing the request-to-speak, without specifying a terminal to be monitored, or in the case where the terminal to be monitored is changed later, the chairman terminal re-sends the notice of switch setting mode via the D-channel to each of the other terminals according to the specification from the speaker. In response to the notice, each of the other terminals sets its switching unit.

In the above-described embodiment, both of the two B-channels are used for data communication. However, only one B-channel can be used because the B-channel is bidirectional. Incidentally, the line control units 26a, 26b of the multipoint conference device 20 and the microprocessor unit 25 also have communication control means using one B-channel, in which 1 B communication is realized by compressing audio and video signals within the band of 1 B or 64 Kbps. By the 1 B communication, one line is sufficient to achieve the same operation as in the above-described embodiment. By setting a subaddress to a telephone number, the B-channel can be switchably used to realize a multipoint multicast system at a low lost.

In the foregoing embodiment, there has been described a system which is constituted by the multipoint conference devices, each of which has two line control units and also serves as a video conference terminal.

Taking advantage of the capability of having two line control units to relay a video received from one of the line control units to the other, the system can be extended to a larger scale system by connecting the independent multipoint video conference systems, each of which is constituted by a plurality of conventional video conference equipments. In this case, the multipoint conference device does not have to serve as the terminal and, hence, a simplified configuration can be employed as shown in FIG. 11.

Figure 11:
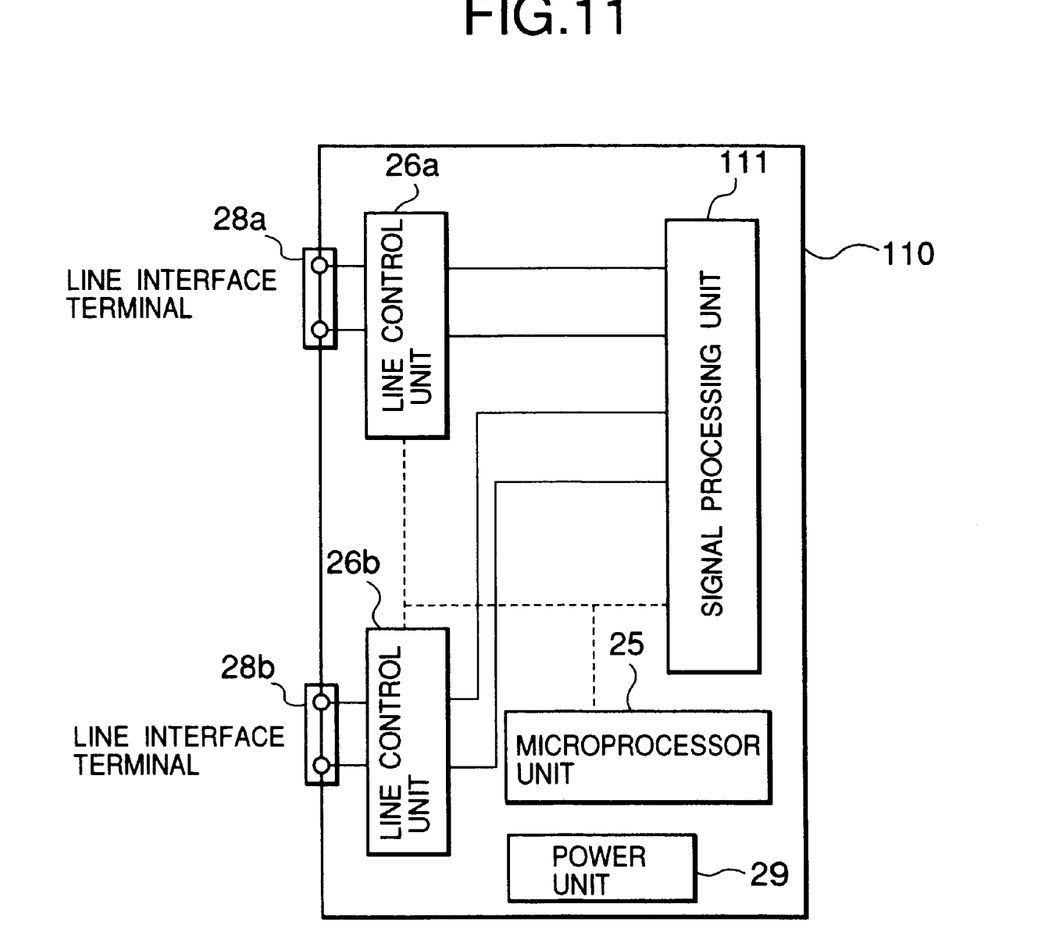
FIG. 11 is a block diagram which shows configuration of a linkage equipment for linking multipoint video conference systems.
Figure 12:
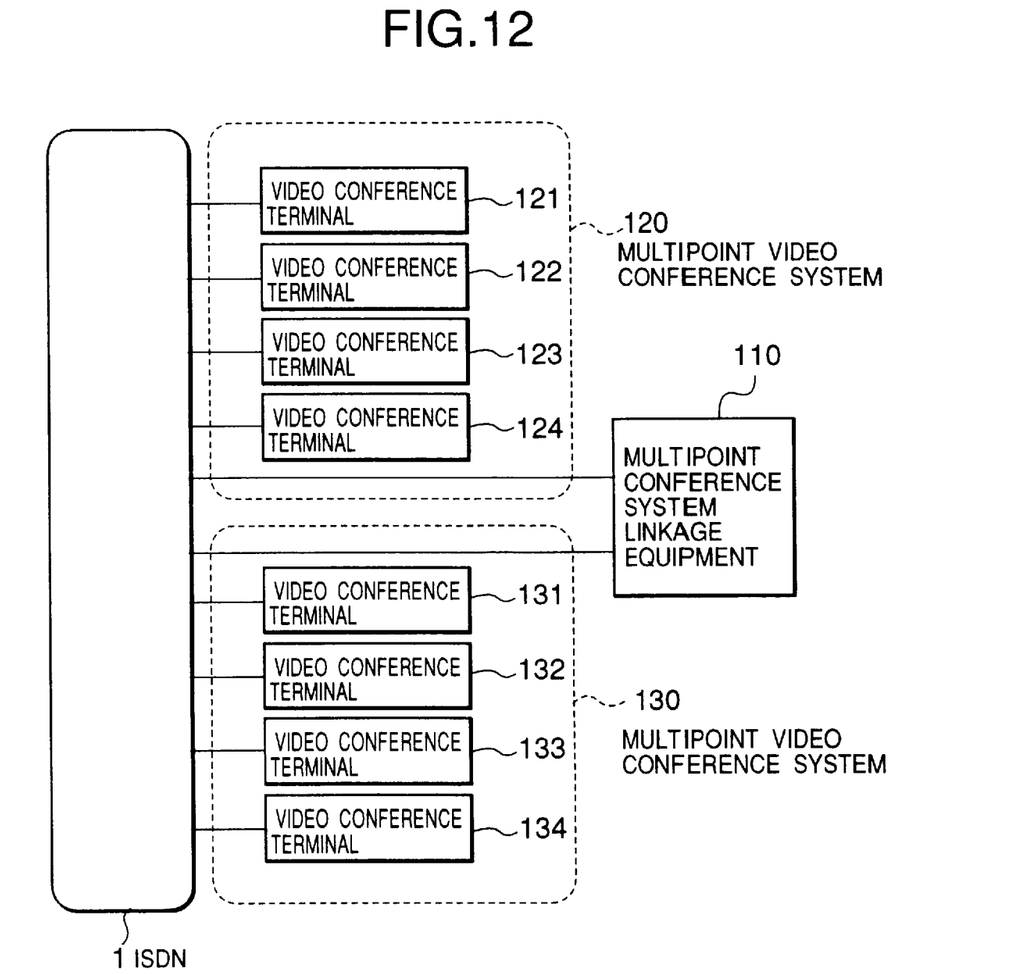
FIG. 12 is a diagram which shows configuration of a linkage system linking two multipoint video conference systems.

FIG. 11 is a block diagram showing configuration of a linkage equipment for linking multipoint video conference systems, which has communication control and data forwarding capabilities without the capability of the terminal. The multipoint video conference system linkage equipment 110 comprises line control units 26a, 26b as mentioned above, a signal processing unit 111 for processing a signal to be relayed between terminals, a microprocessor unit 25 for controlling each of the elements, and a power supply 29, and is connected to the ISDN 1 via the line interface terminals 28a, 28b. FIG. 12 shows a system which uses this multipoint video conference system linkage equipment 110 to couple two multipoint conference systems.

The video conference terminals 121–124 and the video conference terminals 131–134 are conventional video conference terminals. The groups of terminals constitute two independent multipoint video conference systems, respectively. These multipoint video conference systems may be of the type using the MCU or of the type forming a loop information channels of the ISDN. The two ISDN lines of the multipoint video conference linkage equipment 110 are connected to the respective multipoint video conference systems. In the case where the multipoint video conference systems 120, 130 are of the type using the MCU, the ISDN lines are connected to the free ports of the respective MCU's. In the case of the loop multipoint video conference system, the ISDN lines are connected so that the video conference systems 120, 130 become parts of the ring. When viewed from the multipoint video conference systems 120, 130, the line control units 26a, 26b of the multipoint conference system linkage equipment 110 appear as ones of the terminals attending the conference. That is, the multipoint video conference system 120 is constituted by five terminals including the video conference terminals 121–124 and the line control unit 26a of the multipoint conference system linkage equipment 110, and likewise, the multipoint video conference system 130 is constituted by five terminals including the video conference terminals 131–134 and the line control unit 26b of the linkage equipment 110.

Now, assume that the video conference terminal 121 is a speaker, the video and audio signals from which are sent to the video conference terminals 122–124. The video is also sent to the multipoint video conference linkage equipment 110 via the ISDN line on the side of the line control unit 26a. The multipoint video conference linkage equipment 110 relays the video via the ISDN line on the side of the line control unit 26b to the multipoint video conference system 130. The incoming video is forwarded to the four terminals of the multipoint video conference system 130.

This allows linkage of two systems, each originally offering a multipoint connection up to five locations, to provide a capability of multicasting among eight locations.

Further, by using a plurality of the multipoint video conference system linkage equipments 110, three or more multipoint video conference systems can be linked to provide a capability of multicasting among eleven or more locations.

In addition, a multipoint multicast system supporting one more location is achieved by using the above-mentioned multipoint conference device, which has a video conference terminal capability mentioned above, instead of the multipoint video conference system linkage equipment 110.

As described above, by constituting a system with the multipoint conference devices according to the present invention, multipoint multicasting a small scale to a large scale of multipoint video conference among an arbitrary number of locations is realized at a low cost with a compact system configuration.

Also, the system can be realized at further lower cost by employing a configuration which links the conventional multipoint conference systems.

What is claimed is:

1. A video conference equipment for use in a multipoint video conference system in which at least three video conference equipments are connected with each other via a communication network, said video conference equipment, comprising:

line interface terminals to which first and second digital lines, each capable of bidirectional communication, are connected;

external terminals to which input devices for inputting audio, video and data signals and output devices for outputting audio, video and data signals are connected;

two line control units for controlling communications of said first and second digital lines, respectively;

a switching unit for switching over signals to be received and transmitted from said first and second digital lines via said two line control units, signals inputted from said input devices, and signals to be outputted to said output devices; and a control unit for controlling said line control units and said switching unit;

said switching unit being operable to relay a signal received via said first digital line to said second digital line.

2. A video conference equipment for use in a multipoint video conference system in which at least three video conference equipments are connected with each other via a communication network, said video conference equipment, comprising:

line interface terminals to which first and second digital lines, each capable of bidirectional communication, are connected;

external terminals to which input devices for inputting audio, video and data signals and output devices for outputting audio, video and data signals are connected;

two line control units for controlling communications of said first and second digital lines, respectively;

a switching unit for switching over signals to be received and transmitted from said first and second digital lines via said two line control units, signals inputted from said input devices, and signals to be outputted to said output devices; and a control unit for controlling said line control units and said switching unit;

said switching unit being operable to relay a signal received from said input device out of said first and second digital lines.

3. A multipoint video conference system, in which N (where N≧3) video conference equipments are connected with each other via a communication network, for transmitting and receiving audio, video and data signals, each of said video conference equipments, comprising:

line interface terminals to which first and second digital lines, each capable of bidirectional communication, are connected;

two line control units for controlling communications of said first and second digital lines, respectively;

a switching unit for switching over signals to be transmitted and received from said first and second digital lines; and a control unit for controlling various elements;

a first one of said video conference equipments having its second digital line connected to the first digital line of a second one of said video conference equipments;

the second one of said video conference equipments having its second digital line connected to the first digital line of a third one of said video conference equipments;

an (N-1)th one of said video conference equipments having its second digital line connected to the first digital line of an Nth one of said video conference equipments, thus connecting said N video conference equipments with each other; and said switching unit of each video conference equipment being operable to forward a signal received via one of said first and second digital lines to the other one of said first and second digital lines, thereby multicasting data to each of said video conference equipments.

4. A multipoint video conference system, in which N (where N≧3) video conference equipments are connected with each other via a communication network, for transmitting and receiving audio, video and data signals, each of said video conference equipments, comprising:

line interface terminals to which first and second digital lines, each capable of bidirectional communication, are connected;

external terminals to which input devices for inputting audio, video and data signals and output devices for outputting audio, video and data signals are connected;

two line control units for controlling communications of said first and second digital lines, respectively;

a switching unit for switching over signals to be received and transmitted from said first and second digital lines via said two line control units, signals inputted from said input devices via said signal processing unit, and signals to be outputted to said output devices; and a control unit for controlling various elements;

a first one of said video conference equipments having its second digital line connected to the first digital line of a second one of said video conference equipments;

the second one of said video conference equipments having its second digital line connected to the first digital line of a third one of said video conference equipments;

an (N-1)th one of said video conference equipments having its second digital line connected to the first digital line of an Nth one of said video conference equipments, thus connecting said N video conference equipments with each other; and said switching units of said video conference equipments being controlled so as to multicast signals, transmitted from upchannels of said first and second digital lines of a particular one of said video conference equipments, to all the other video conference equipments, and to forward a signal inputted from said input device of one video conference equipment, which is specified by said particular one of said video conference equipments, to said particular one of said video conference equipments.

5. A multipoint video conference system for performing a video conference communication, in which N (where N≧3) video conference equipments are connected to a communication network via first and second digital communication lines, each line for transmitting and receiving control information and video conference data, each one of said N video conference equipments, comprising:

an input means for inputting video conference data;

an output means for outputting said video conference data;

a line interface unit for connecting its respective one of said N video conference equipments to said first and second digital communication lines;

a switching unit for selecting data to be transmitted, and for selecting data to be outputted by said output means from among data received from said first and second digital communication lines and data inputted from said input means;

an operation unit for operating said video conference equipment; and a control means, responsive to operation information inputted from said operation unit and control information received via said digital communication lines, for controlling its respective one of said N video conference equipments and for transmitting control information via said digital communication lines;

wherein when one of said N video conference equipments transmits control information via said communication network in response to the operation information from said operation unit, each control means of said N video conference equipments connected to said communication network controls the switching unit thereof so as to perform a video conference communication among said N video conference equipments.

6. A multipoint video conference system according to claim 5, wherein said switching unit includes:

a first switch for selecting and outputting to said first digital communication line, either data inputted from said input means or video conference data received via said second digital communication line;

a second switch for selecting and outputting by said output means, video conference data received via said first or second digital communication line; and a third switch for selecting and outputting to said second digital communication line, either data inputted from said input means or video conference data received from said first digital communication line.

7. A multipoint video conference system according to claim 5, wherein said switching means includes a throughput mode in which video conference data received from one of said first and second digital communication lines is transmitted via the other of said first and second digital communication lines, and a speaker mode in which video conference data is inputted from said input means via said first and second digital communication lines.

8. A multipoint video conference system according to claim 7, wherein when a first one of said N video conference equipments issues a request to speak from the operation unit thereof, said control means of the first video conference equipment transmits control information of the request to speak to a second one of said N video conference equipments, in response to which, said second video conference equipment, when granting said request to speak, transmits a control signal to allow said first video conference equipment to speak and said first video conference equipment sets said switching unit to said speaker mode in response to the control signal, while said second video conference equipment transmits control information to set up each one of the N video conference equipments other than said first video conference equipment into said throughput mode.

* * * * *